US006283107B1

(12) United States Patent
Koerner

(10) Patent No.: US 6,283,107 B1
(45) Date of Patent: Sep. 4, 2001

(54) METHODS AND APPARATUS FOR MEASURING ATMOSPHERIC PRESSURE AND EXHAUST BACK PRESSURE

(75) Inventor: Scott Alan Koerner, Kenosha, WI (US)

(73) Assignee: Bombardier Motor Corporation of America, Melbourne, FL (US)

( * ) Notice: Subject to any disclaimer, the term of this patent is extended or adjusted under 35 U.S.C. 154(b) by 0 days.

(21) Appl. No.: 09/251,584

(22) Filed: Feb. 17, 1999

(51) Int. Cl.[7] .............................. F02D 41/00; G01L 23/22

(52) U.S. Cl. ................................................ 123/676; 73/115

(58) Field of Search ..................................... 123/676, 679, 123/691, 465, 494, 406.68; 73/714, 753, 756, 115

(56) References Cited

U.S. PATENT DOCUMENTS 3,931,808 * 1/1976 Rachel .................................. 123/488
4,388,825 * 6/1983 de Valpillieres ........................ 73/115
4,926,335 * 5/1990 Flowers et al. ....................... 701/103
5,051,909 * 9/1991 Gomez et al. ........................ 701/103
5,542,390 * 8/1996 Hartman et al. ................ 123/406.68
5,845,627 * 12/1998 Olin et al. ............................ 123/676
5,979,160 * 11/1999 Yashiki et al. .......................... 60/276
6,067,966 * 5/2000 Saito et al. ........................... 123/514

* cited by examiner

*Primary Examiner*—Andrew M. Dolinar
*Assistant Examiner*—Arnold Castro
(74) *Attorney, Agent, or Firm*—Armstrong Teasdale LLP

(57) ABSTRACT

An engine including, in one embodiment, a pressure sensor utilized for determining both barometric pressure and engine exhaust back pressure is described. More specifically, and in the one embodiment, the engine includes an electronic control unit (ECU) including a processor. The pressure sensor is a component of the ECU, and the pressure sensor is in communication, e.g., via a conduit, with the engine exhaust duct. The processor is programmed to obtain signals from the pressure sensor that are representative of both barometric pressure and engine exhaust back pressure. More particularly, the processor is programmed to sample a pressure representative signal generated by the sensor during a first time period to obtain a signal representative of barometric pressure, and to sample a pressure representative signal generated by the sensor during a second time period to obtain a signal representative of engine exhaust back pressure. The first time period initiates when the engine ignition switch is turned on, and terminates prior to when the engine generates exhaust. The second time period initiates upon termination of the first time period, and terminates when the engine ignition switch is turned off.

14 Claims, 3 Drawing Sheets

METHODS AND APPARATUS FOR MEASURING ATMOSPHERIC PRESSURE AND EXHAUST BACK PRESSURE

BACKGROUND OF THE INVENTION

This invention relates generally to marine propulsion engines, and more specifically, to determining atmospheric pressure and exhaust back pressure.

Fuel flow to cylinders in engines including electronic fuel injection systems typically is adjusted based on a number of engine operating parameters, including air flow. For example, as air flow to the cylinders increases, fuel flow to the cylinders also must increase in order to maintain good combustion. As air flow to the cylinders decreases, fuel flow also must decrease.

Fuel flow to the cylinders also is adjusted based on operating parameters such as atmospheric pressure and intake air temperature. An absolute pressure sensor typically is utilized for generating a signal representative of atmospheric pressure, and a temperature sensor typically is located at the engine air intake to generate a signal representative of intake air temperature. The sensors are coupled to, or part of, an electronic control unit (ECU), which samples the signals generated by the sensors and adjusts fuel flow according to the sampled signals.

Another parameter that has a significant impact on air flow through the engine is exhaust back pressure. Specifically, outboard motors vent exhaust gases downwardly through an exhaust housing to a through-the-hub propeller. Hydrodynamic effects due, for example, to propeller rotation, impact the exhaust back pressure. Increased back pressure can restrict or prevent the venting of exhaust gases.

To determine exhaust back pressure, a pressure sensor can be added in the exhaust flow path. Adding a pressure sensor, however, increases the engine cost and complexity. Further, by adding another sensor, engine reliability may be adversely impacted since an extra sensor increases the possibility for a sensor failure.

It would be desirable to enable determination of both atmospheric pressure as well as engine exhaust back pressure, yet avoid the extra cost and complexity, and reliability concerns associated with adding an additional sensor to the engine.

BRIEF SUMMARY OF THE INVENTION

These and other objects may be attained by an engine including, in one embodiment, a pressure sensor utilized for determining both atmospheric, or barometric, pressure and engine exhaust back pressure. More specifically, and in the one embodiment, the engine includes an electronic control unit (ECU) including a processor. The pressure sensor is a component of the ECU, and the pressure sensor is in communication, e.g., via a conduit, with the engine exhaust duct.

The processor is programmed to obtain signals from the pressure sensor that are representative of both barometric pressure and engine exhaust back pressure. More particularly, the processor is programmed to sample a pressure representative signal generated by the sensor during a first time period to obtain a signal representative of barometric pressure, and to sample a pressure representative signal generated by the sensor during a second time period to obtain a signal representative of engine exhaust back pressure. The first time period initiates when the engine ignition switch is turned on, and terminates prior to when the engine generates exhaust. The second time period initiates upon termination of the first time period, and terminates when the engine ignition switch is turned off. Using the pressure sensor and processor described above, both atmospheric pressure as well as engine exhaust back pressure are determined, yet the extra cost and complexity associated with adding an extra sensor are avoided. In addition, by using only one sensor to determine both barometric and engine exhaust back pressure, reliability concerns associated with adding an additional sensor to the engine are avoided.

DETAILED DESCRIPTION OF THE INVENTION

The present invention is described herein in the context of an outboard engine. The present invention could, however, be utilized in connection with a stern drive engine as well as with an outboard engine. Further, the present invention is not limited to practice with any one particular engine, and therefore, the following description of an exemplary engine relates to only one exemplary implementation of the present invention.

Figure 1:
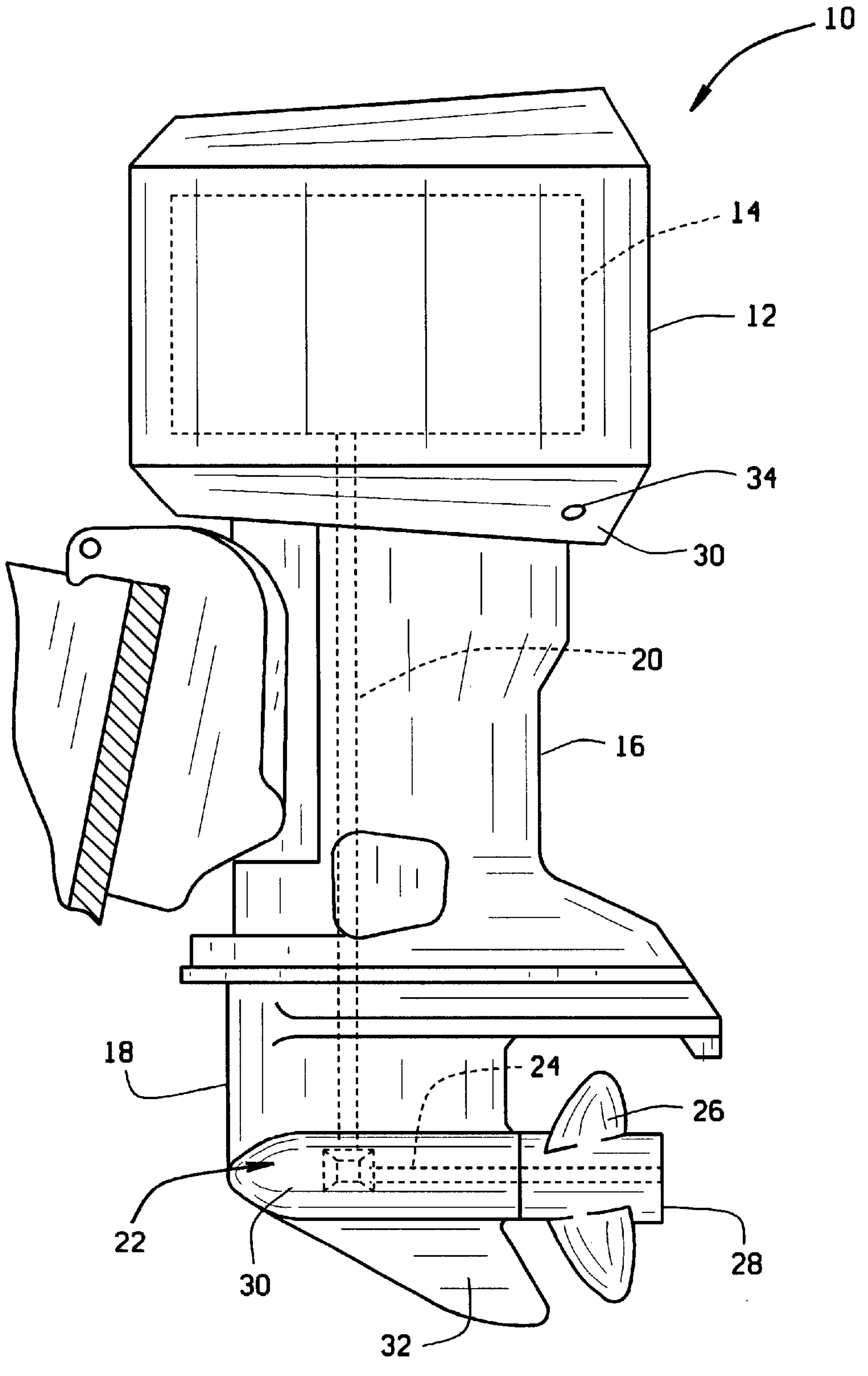
FIG. 1 is a side view of an outboard engine.

Referring more particularly to the drawings, FIG. 1 is a perspective view of an outboard engine 10, such as an outboard engine commercially available from Outboard Marine Corporation, Waukegan, Ill. Engine 10 includes a cover 12 which houses a power head 14, an exhaust housing 16, and a lower unit 18. A drive shaft 20 extends from power head 14, through exhaust housing 16, and into lower unit 18.

Lower unit 18 includes a gear case 22 which supports a propeller shaft 24. One end of propeller shaft 24 is engaged to drive shaft 20, and a propeller 26 is engaged to an opposing end of shaft 24. Propeller 26 includes an outer hub 28 through which exhaust gas is discharged. Gear case 22 includes a bullet, or torpedo, 30 and a skeg 32 which depends vertically downwardly from torpedo 30.

Power head 14 includes an internal combustion engine having an exhaust system with an exhaust outlet. Power head 14 also includes an adapter 30. A port 34 is located in adapter and typically is used for emission testing of engine 10. A main exhaust gas duct extends through adapter 30 and exhaust housing 16 and into lower unit 18 so that exhaust flows from power head 14 through the gas duct and out hub 28.

As explained above, a parameter that has a significant impact on air flow through engine 10 is exhaust back pressure. At high speeds or when engine 10 is raised up in the water so that hub 28 is near the surface of the water, exhaust gases can easily pass through exhaust housing 16 and out through hub 28. At idle or slow speed conditions, however, propeller 26 is lower in the water, which results in an increased back pressure at hub 28. The increased back pressure can restrict or prevent the venting of exhaust gases. The speed of the boat, and the particular boat configuration (e.g., the depth at which the exhaust exits through propeller 26) impact exhaust back pressure.

Figure 2:
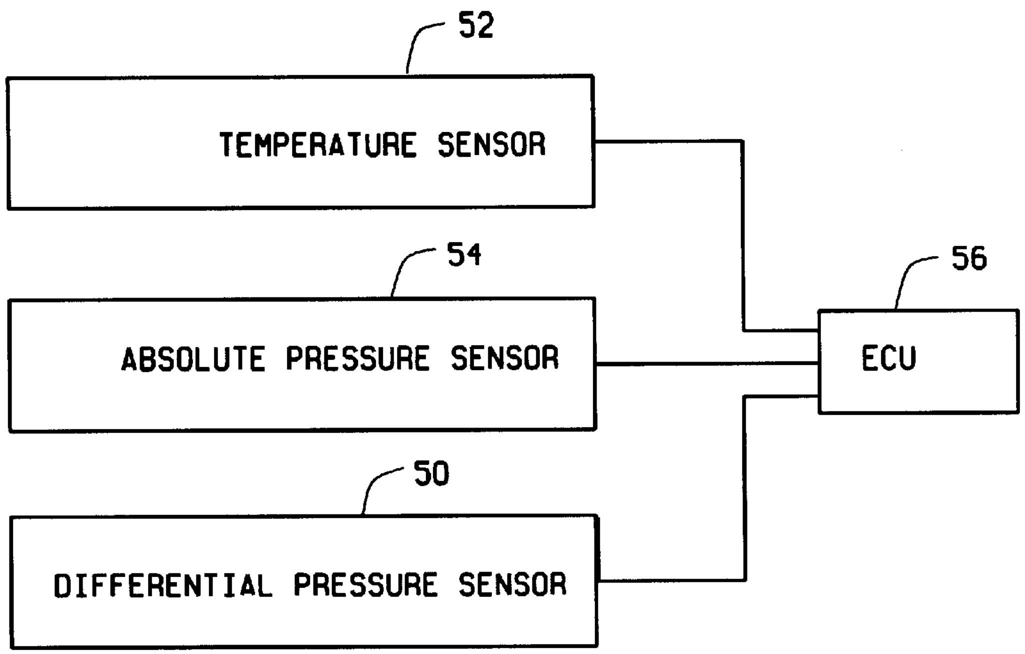
FIG. 2 is a block diagram of a system for sensing temperature, atmospheric pressure, and exhaust back pressure.

Referring to FIG. 2, and to determine exhaust back pressure, a differential pressure sensor 50 can be added in the exhaust flow path. A temperature sensor 52 and an absolute pressure sensor 54 also are provided for measuring inlet air temperature and atmospheric pressure, respectively. Sensors 50, 52, and 54 are coupled to an electronic control unit (ECU) 56, which is well known in the art. ECU 56 includes a processor, and the ECU processor samples the respective signals generated by sensors 50, 52, and 54 to adjust fuel flow during engine operation. As used herein, the term processor is not limited to a microprocessor, but includes circuits, controllers and all other known electronic controls and apparatus capable of controlling at least some aspects of engine operations.

Temperature sensor 52 and absolute pressure sensor 54 typically are used in connection with engines having fuel injection. Adding differential pressure sensor 50 increases the engine cost and complexity. Further, by adding sensor 50, engine reliability may be adversely impacted since an extra sensor increases the possibility for a sensor failure.

Figure 3:
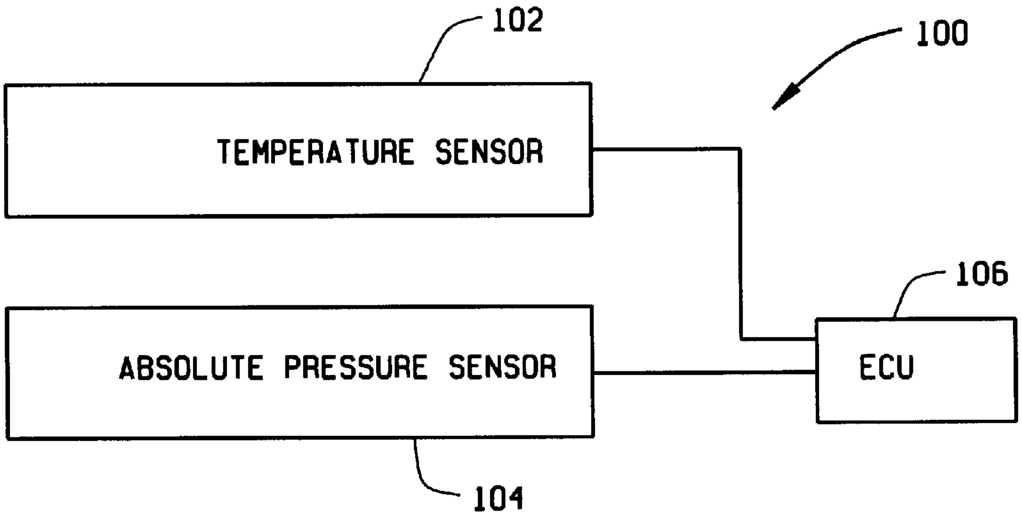
FIG. 3 is a block diagram of a system for sensing temperature, atmospheric pressure, and exhaust back pressure in accordance with one embodiment of the present invention.

FIG. 3 is a block diagram of a system 100 for sensing temperature, atmospheric pressure, and exhaust back pressure in accordance with one embodiment of the present invention. As shown in FIG. 3, a temperature sensor 102 and an absolute pressure sensor 104 are coupled to an ECU 106. ECU 106 samples the respective signals generated by sensors 102 and 104 to adjust fuel flow during engine operation. Temperature sensor 102, as is known in the art, is utilized for measuring inlet air temperature.

Absolute pressure sensor 104 is utilized for measuring both atmospheric, or barometric, pressure and exhaust back pressure. Particularly, and in one embodiment, sensor 104 is mounted on the same circuit board along with the ECU processor and other components. Sensor 104, in this embodiment, is a component of ECU 106. A flexible tube or conduit extends from sensor 104, to the engine main exhaust duct, e.g., to port 34, and sensor 104 is exposed to the pressure at port 34. In one embodiment, a diaphragm is positioned at an intermediate location between first and second conduit sections so that the pressure is effectively communicated, but exhaust gases as well as any dirt or other debris are blocked from direct contact with sensor 104. Sensor 104 generates a signal representative of such pressure, and the ECU processor samples the signal generated by sensor 104.

Sensor 104 may be any pressure sensor capable of sensing pressure in a range of about 60 to 115 k.p.a. One such commercially available and known sensor is the Motorola MPX 4115 sensor. Many other commercially available sensors could be utilized.

In an alternative embodiment, sensor 104 is located at port 34, and is electrically connected to the ECU processor via a communications bus. Such an arrangement provides the benefit of eliminating the conduit and diaphragm arrangement described above. However, sensor 104 may be more exposed to exhaust, heat, and water. Many other embodiments and variations are possible.

Figure 4:
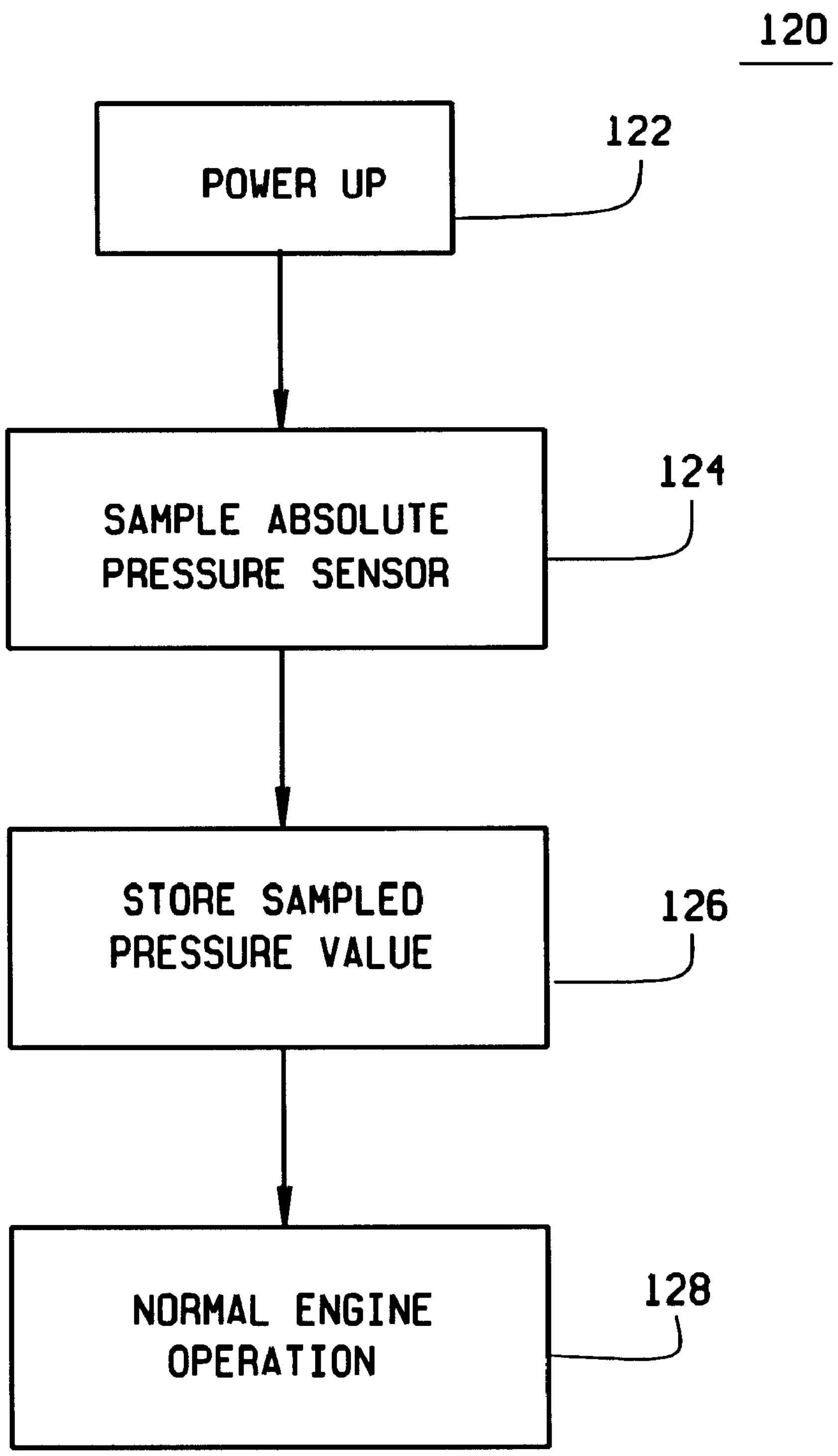
FIG. 4 is a flow chart of process steps executed by the electronic control unit in accordance with one embodiment of the present invention.

FIG. 4 is a flow chart 120 of process steps executed by the electronic control unit in accordance with one embodiment of the present invention. As explained above, ECU 106 includes a processor, or controller, as is known in the art. The ECU processor is coupled to sensor 104, and in one embodiment, is programmed to determine both barometric pressure and exhaust back pressure from sensor 104.

More specifically, and once the ignition key is turned on, ECU 106 is energized 122 and processor begins operations, even before the engine crankshaft begins to turn. Upon power-up, the ECU processor samples 124 absolute pressure sensor 104 during first time period to obtain a pressure representative signal. The first time period initiates when the engine ignition switch is turned on and ends before engine 10 generates exhaust. In this condition, the sample from pressure sensor is representative of barometric pressure and not exhaust back pressure since the engine crankshaft has not even yet begun to rotate. Since the crankshaft is not rotating, no air is moving due to engine operation. Therefore, the pressure in exhaust housing 16 is equal to the atmospheric pressure. The value obtained from pressure sensor 104 is then stored 126 in a predesignated memory location of ECU memory for use during engine operations, and is utilized whenever a barometric pressure value is needed during engine operations.

Since barometric pressure will not normally change significantly during one cycle of engine operations, i.e, one cycle refers to the duration of engine operations from turning the ignition key on to turning the ignition key off, the barometric pressure can be determined just once and stored in memory for use during the entire cycle. Particularly, since there is no significant change in altitude on a body of water, there should be no change in barometric pressure during the cycle of operation.

During normal engine operations, e.g., the second time period, the ECU processor samples pressure sensor in accordance with its pre-programmed instructions to determine engine exhaust back pressure, as needed, 128. The second time period initiates upon termination of the first time period and ends when the ignition key is turned off. The fuel flow can then be adjusted based on the stored value representative of barometric pressure and the most recently determined value of engine exhaust back pressure.

The above described system for sensing both atmospheric pressure as well as engine exhaust back pressure avoids the extra cost and complexity, and reliability concerns associated with adding an additional sensor to the engine. In addition, the pressure values obtained using such system are reliable and can be used to control fuel flow to the engine cylinders.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An engine comprising:

a power head comprising an adapter;

an exhaust housing extending from said power head adapter;

a lower unit extending from said exhaust housing;

an exhaust duct extending from said adapter through said exhaust housing and into said lower unit;

a pressure sensor in communication with said exhaust duct; and a processor for obtaining, from said pressure sensor, a first signal representative of barometric pressure and a second signal representative of engine exhaust back pressure.

2. An engine in accordance with claim 1 further comprising a drive shaft extending from said power head, through said exhaust housing, and into said lower unit.

3. An engine in accordance with claim 1 further comprising an electronic control unit, said electronic control unit comprising said processor.

4. An engine in accordance with claim 3 wherein said electronic control unit further comprises said sensor, a conduit extending from said exhaust duct to said sensor.

5. An engine in accordance with claim 4 wherein one end of said conduit is located at said adapter.

6. An engine in accordance with claim 4 wherein said conduit comprises a first conduit section and a second conduit section, and a diaphragm between said conduit sections.

7. An engine in accordance with claim 1 wherein said sensor is located at said exhaust duct.

8. An engine in accordance with claim 1 wherein said processor programmed to:

sample a pressure representative signal generated by said sensor during a first time period to obtain said first signal; and sample a pressure representative signal generated by said sensor during a second time period to obtain said second signal.

9. An engine in accordance with claim 8 wherein said first time period initiates when an engine ignition switch is turned on, and terminates prior to when said engine generates exhaust.

10. An engine in accordance with claim 8 wherein said second time period initiates upon termination of said first time period, and terminates when said engine ignition switch is turned off.

11. A kit for use in connection with a marine engine including an exhaust duct, said kit comprising:

a pressure sensor for being in communication with the exhaust duct;

a processor for obtaining, from said pressure sensor, a first signal representative of barometric pressure and a second signal representative of engine exhaust back pressure; and a conduit for extending from the exhaust duct to said sensor, said conduit comprises a first conduit section and a second conduit section, and a diaphragm between said conduit sections.

12. A kit in accordance with claim 11 wherein said processor is programmed to:

sample a pressure representative signal generated by said sensor during a first time period to obtain said first signal; and sample a pressure representative signal generated by said sensor during a second time period to obtain said second signal.

13. A kit in accordance with claim 12 wherein said first time period initiates when an engine ignition switch is turned on, and terminates prior to when the engine generates exhaust.

14. A kit in accordance with claim 12 wherein said second time period initiates upon termination of said first time period, and terminates when an engine ignition switch is turned off.

* * * * *